United States Patent [19]

Takayasu

[11] Patent Number: 4,813,176
[45] Date of Patent: Mar. 21, 1989

[54] AEROPONIC APPARATUS

[76] Inventor: Masakatsu Takayasu, 960-banchi, Aza-Taba, Gushikawa-shi, Okinawa-ken 904-22, Japan

[21] Appl. No.: 147,666

[22] Filed: Jan. 25, 1988

Related U.S. Application Data

[63] Continuation of Ser. No. 877,562, Jun. 23, 1986, abandoned.

[51] Int. Cl.$^4$ ............................................. A01G 31/02
[52] U.S. Cl. .............................................. 47/59; 47/63
[58] Field of Search ................................ 47/59-65, 47/79-81, 18, 1.4, 14, 85, 87, 41.11, 41.12, 41.13; 52/39, 125.1

[56] References Cited

U.S. PATENT DOCUMENTS

| | | | |
|---|---|---|---|
| 2,189,510 | 2/1940 | Swaney | 47/63 |
| 2,639,549 | 5/1953 | Wubben et al. | 47/79 |
| 2,732,177 | 1/1956 | Ludowici | 52/125.1 |
| 2,884,740 | 5/1959 | Hollander | 47/61 |
| 3,302,363 | 2/1967 | Frey | 52/125.1 |
| 3,382,627 | 5/1968 | Vartia | 52/125.1 |
| 3,906,667 | 9/1975 | Williams | 47/79 |
| 3,906,667 | 9/1975 | Williams | 47/75 |
| 4,004,389 | 1/1977 | Kato et al. | 47/62 |
| 4,224,765 | 9/1980 | Song | 47/85 |
| 4,332,105 | 6/1982 | Nix | 47/59 |
| 4,382,348 | 5/1983 | Kitsu et al. | 47/59 |
| 4,392,327 | 7/1983 | Sanders | 47/81 |
| 4,513,533 | 4/1985 | Gething et al. | 47/63 |
| 4,514,930 | 5/1985 | Schorr et al. | 47/63 |
| 4,521,989 | 6/1985 | Meyer | 47/65 |

FOREIGN PATENT DOCUMENTS 7762390 9/1978 Netherlands ............................ 47/62

Primary Examiner—Richard J. Johnson
Assistant Examiner—Danton D. DeMille
Attorney, Agent, or Firm—Jordan and Hamburg

[57] ABSTRACT

An aeroponic apparatus in which holding frames which directly hold the plants without flowerpots are mounted on a cultivation tank containing water or culture liquid and the plants are easily moved in the air, water or culture liquid by controlling the amount of water or culture liquid in the cultivation tank or the space between holding frames and the cultivation tank by moving either the frames or the tank.

4 Claims, 6 Drawing Sheets

AEROPONIC APPARATUS

This application is a continuation of application Ser. No. 877,562, filed June 23, 1986 now abandoned.

FIELD OF THE INVENTION

The present invention relates to a method of cultivation and an aeroponic apparatus, in which the plants are cultivated in air, and to apparatus particularly useful for the cultivation of aerial root plants such as orchidacese plants.

BACKGROUND OF THE INVENTION

It is not necessary to give water continuously to aerial root plates such as ordhidacese plants because they retain water in their roots for a long time once they have absorbed water, and their roots would rot if given too much water. Thicket materials such as watermoss orcharcoal usually are cultivated in flowerpots for aerial root plants with the aerial root plants being stabilized by said thicket materials.

However, cultivation in flowerpots has the following drawbacks:

(1) The thicket materials are expensive, and aerial root plants repeatedly are transplanted as they grow which requires time. Moreover, the inside of a flowerpot is covered with roots, which can be damaged at the time of transplanting.

(2) It is difficult to control the amount of water or culture liquid because the thicket materials keep water or culture liquid and water so that culture liquid always remains in flowerpots.

(3) Water cannot be given directly to flowers nor fertilizer directly to sprouts so that time is required for these operations.

(4) Weeds grow easily to the thicket materials, and it takes time to remove weeds.

OBJECTS AND SUMMARY OF THE INVENTION

It is an object of the present invention to provide a cultivation apparatus, in which it is not necessary to prepare thicket materials and to transplant.

It is another object of the present invention to provide a method of cultivation and an apparatus, in which water or culture liquid is easily given to the plants.

These and other objects of the present invention are achieved by a cultivation apparatus comprisng a cultivation tank containing water or culture liquid and holding frames directly keeping the plants without flowerpots, the roots of the plants kept by holding frames being easily supplied with water or culture liquid by controlling the amount of water or culture liquid in the cultivation tank or changing the space between the cultivation tank and holding frames. The amount of water or culture liquid in a cultivation tank in the present invention is controlled by controlling supply and discharge thereof into a cultivation tank, with feed pumps arranged at suitable locations. The inventive method comprises controlling the space between a cultivation tank and holding frames, moving the plants into water or in air without changing the amount of water or culture liquid in the cultivation tank; displacing one or both of the cultivation tank and holding frames up and down instead of moving the plants under cultivation.

The art is aware of several methods for displacing a cultivation tank up and down. For example, a cultivation tank can be hung by a motor-operated chain, or a method, in which a balloon body which is easily expanded and controlled by air pressure is associated with a lower part of a cultivation tank, and a cultivation tank is raised by expanding a balloon body and lowered by deflating a balloon body.

DETAILED DESCRIPTION OF THE INVENTION

An aeroponic apparatus according to the present invention is explained by referring to the above Figures.

Figure 1:
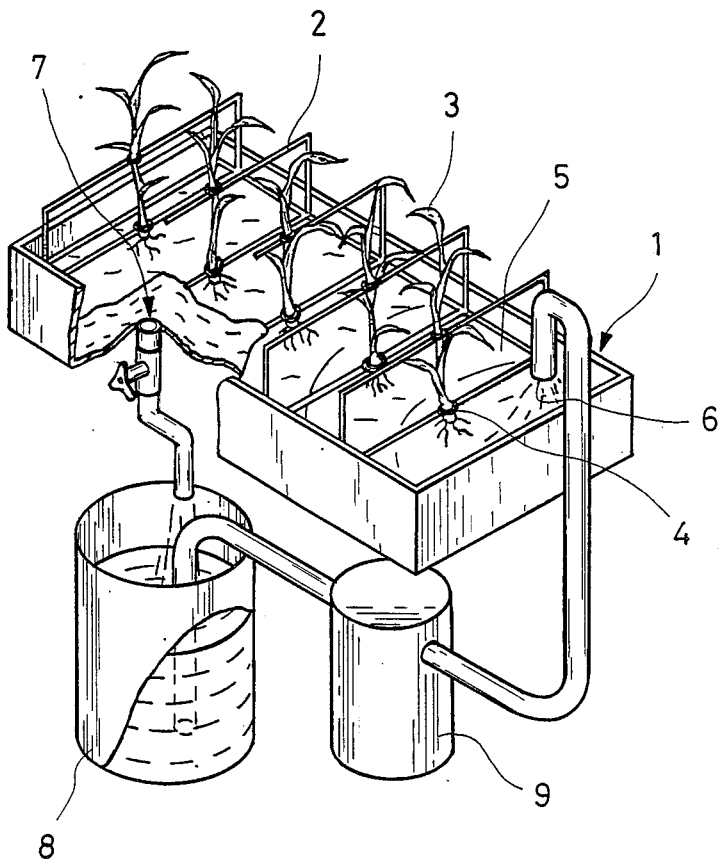
FIG. 1 is a perspective view of an apparatus according to this invention, in which the amount of water or culture liquid is controlled in a cultivation tank.

FIG. 1 shows a perspective view of an apparatus, in which plane holding panels 2 are fixed to the upper parts of an open top cultivation tank 1 with plants 3 tied to panels 2. Holding panels 2 in FIG. 1 have top and bottom support parts to which are secured plants above their roots by their stalks using thin strings. Water or culture liquid is supplied to tank 1 from a supply pipe 6 through outlet 7. The amount of water or culture liquid fed to cultivation tank is adjusted by controlling inflow and outflow thereto. In FIG. 1, 8 is a portable tank for discharged waste water or culture liquid, and 9 is a supply pump.

In the apparatus in FIG. 1, the amount of water and nourishing or culture liquid (water containing nutrients) is controlled according to the kind or growing condition of the plants 3. For example, in the case of aerial root plants, the amount of water or culture liquid is increased so that the roots of the aerial root plants are soaked in water or culture liquid 5 10–24 times per 1 day and for 1 minute per each application, or a cultivation tank 1 is emptied to decrease the amount of water or culture liquid to such an extent that the roots of the plants become exposed to air. Thus, water or culture liquid is economized by connecting a group of cultivation tanks and sequentially circulating in turn water or culture liquid to each cultivation tank. Accordingly, in the case of common plants (not aerial root plants), the roots have to be soaked in water or culture liquid 5 more times and longer than the above-mentioned aerial root plants.

Figure 2:
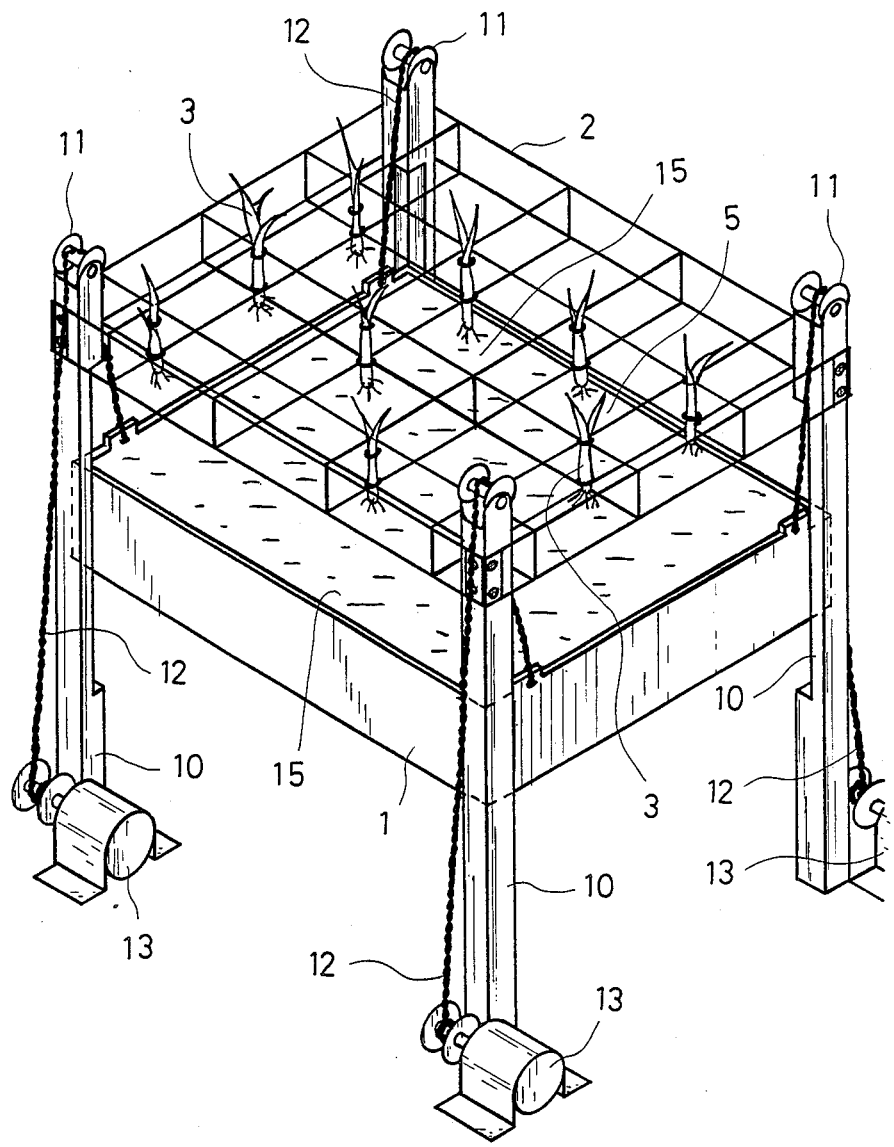
FIG. 2 is a perspective view showing an apparatus, in which a cultivation tank is freely moved up and down by a chain.

Next, FIG. 2 shows one example of an aeroponic apparatus, having a vertically slidable cultivation tank 1. Here, panels 2 are fixed to the upper parts of supports 10 and cultivation tank 1 is suspended to the upper ends of chains 12 wound on pulleys 11 fixed to upper parts of the supports 10. The lower parts of chains 12 are folled and are connected to motors 13, which wind and unwind the chains to raise and lower tank 1 by sliding it inside the supports 10.

Figure 3:
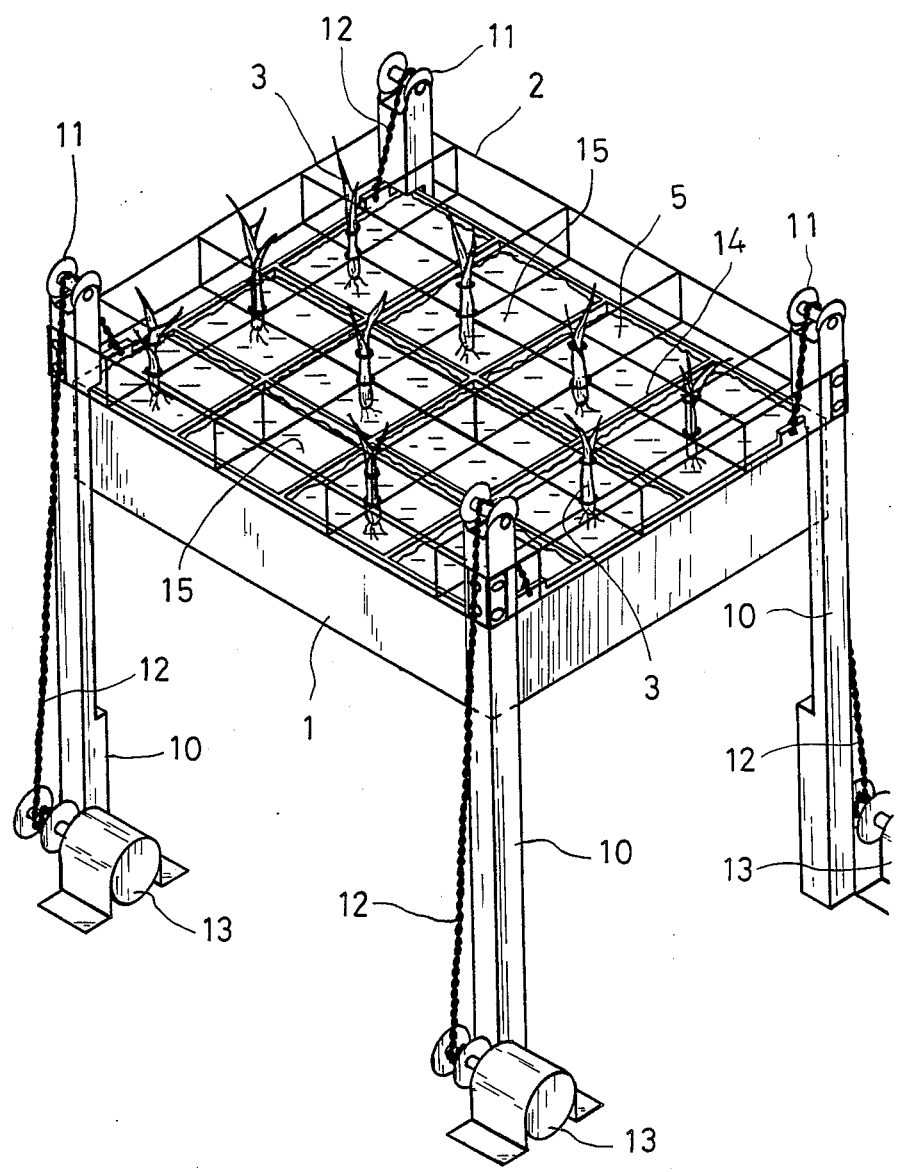
FIG. 3 is a perspective view showing the apparatus in FIG. 3, in which a cultivation tank is divided into small cultivation compartments.

FIG. 3 shows an aeroponic apparatus, in which a cultivation tank 1 is divided into small independent cultivation compartments 15 by partitions 15, so as to prevent infection of plants by germs. For example, if one of the plants 3 in a cultivation tank 1 which is one big tank is infected by germs, it can infect other plants through water or culture liquid.

In the aeroponic apparatus shown in FIGS. 2 and 3, water or culture liquid is given to the plants by lifting a cultivation tank 1, and the plants are set in air by taking down a cultivation tank 1 after the end of the given water supply time. Therefore, the amount of water or culture liquid is always kept the same.

Figure 4:
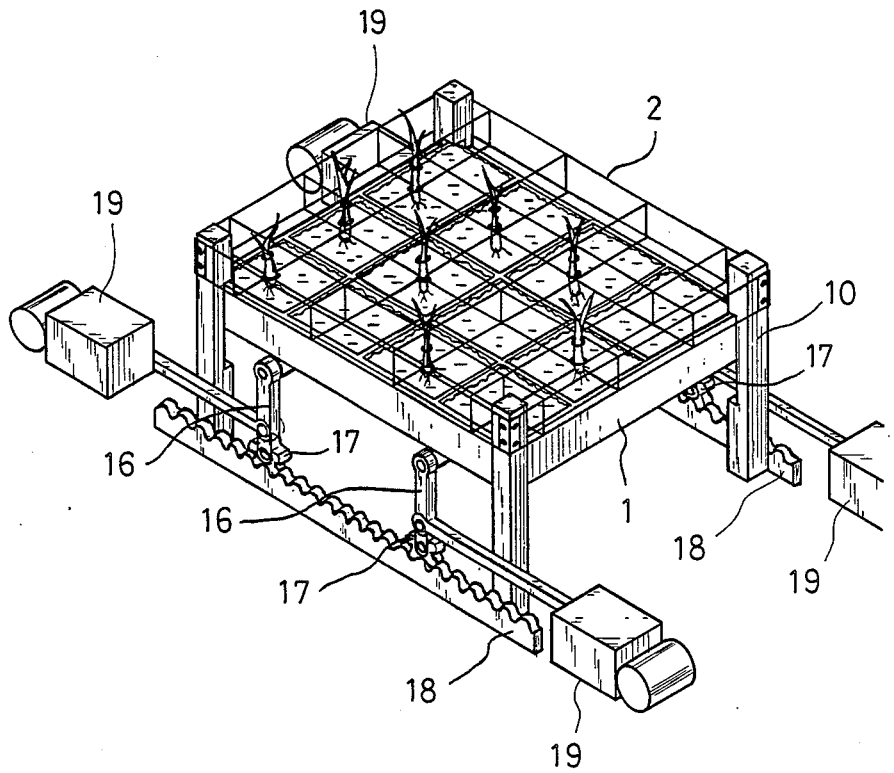
FIG. 4 is a perspective view showing an apparatus in accordance with this invention, in which a cultivation tank is freely moved up and down by pedals whose angular slope is freely changed.

FIG. 4 shows an aeroponic apparatus with a vertically movable cultivation tank 1 and wherein the upper links 16 are fixed to the bottom of both sides of a cultivation tank 1 arranged to lower parts of holding frames 2 fixed to the upper ends of supports 10, with freely rotatable small gears 17 fixed to the lower ends of link 16. Cultivation tank 1 moves by changing the angle of link 16, having small gears 17 meshing with plane toothlike rails 18. 19 in FIG. 4 shows a geared motor which operatively actuates small toothed wheels 17.

Figure 5:
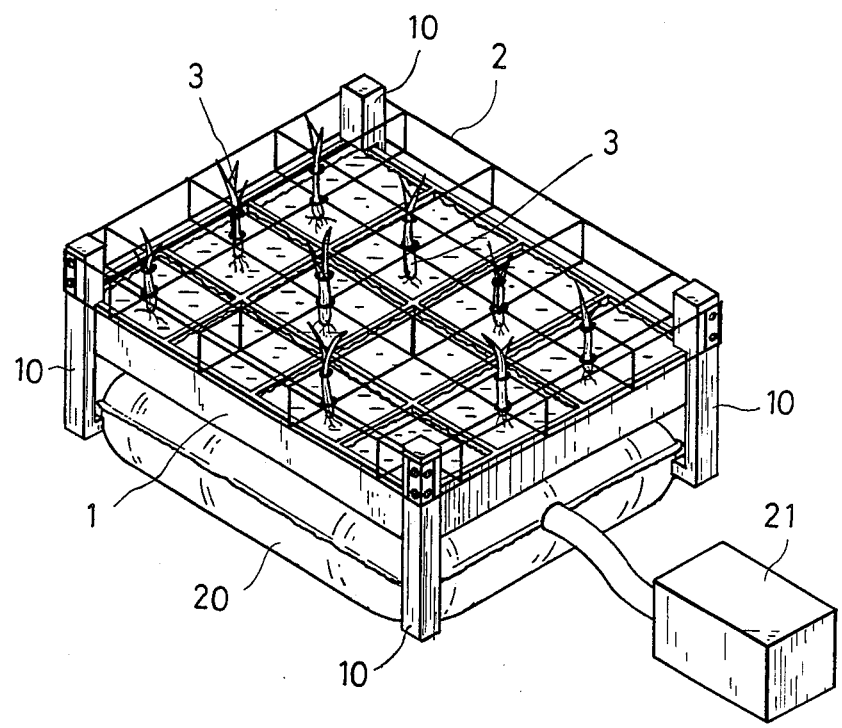
FIG. 5 is a perspective view of an apparatus according to this invention, in which a cultivation tank is raised and lowered by expanding and deflating a balloon, FIG. 6-A is a partly diagrammatic and cross-sectional view of an apparatus according to the invention, in which a cultivation tank is freely moved by a forcing device, and FIG. 6-B is a cross-sectional view of the embodiment of FIG. 6-A showing how the forcing device raises one of the cultivation tanks.

Next, FIG. 5 shows a method, in which a cultivation tank 1 arranged to lower parts of holding frames 2 fixed to upper parts of supports 10 is arranged on a balloon 20 which can be inflated and deflated. The vertical position of cultivation tank 1 can be adjusted by controlling the amount of air supplied to balloon 20 by air pump 21.

Figure 6A:
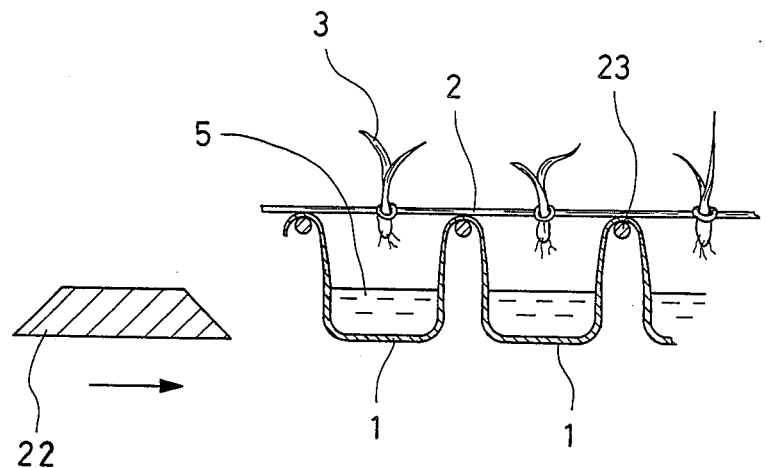
Figure 6B:
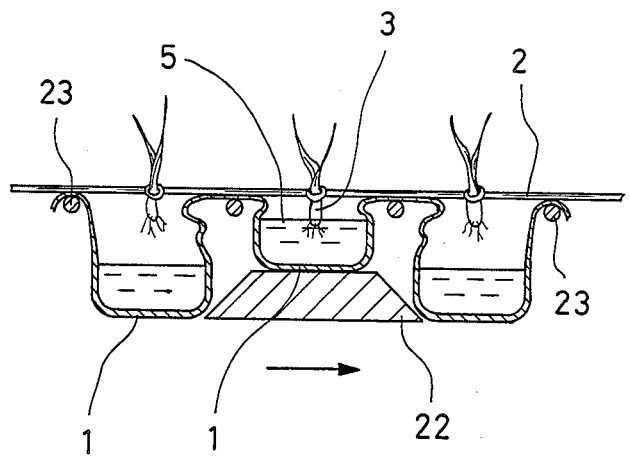

FIG. 6-A shows a method, in which the bottom part of a cultivation tank 1 is pushed up by tool 22 whose surface is planar and which displaces water or culture liquid of cultivation tank 1. This cultivation tank 1 has at least its bottom formed of flexible materials hanging from supports 23 as shown in FIG. 6-A. As shown cultivation tank 1 is pushed up by moving tool or device 22 from the side to keep the roots of the plants in contact with water or culture liquid in the cultivation tank 1. A porous plate or a partition whose circumference is slightly open, is arranged in the middle part of tank 1, water or culture liquid ascends from porous plate or from an opening of the plate when tank 1 is pushed up and water or culture liquid is kept under a partition plate in other case. From the above-mentioned method, the roots of aerial root plants are intercepted by a partition plate even if the roots are sufficiently grown up and are not soaked in water or culture liquid too long.

As mentioned in the above, it is possible to give water or culture liquid to the plants only at the time when it is required in response to the kind or growing process of the plants by controlling the amount of water or culture liquid in a cultivation tank or the space between holding frames and the cultivation tank, with the roots of the plants kept in air when water or culture liquid is not required. Therefore, it is not necessary to prepare flowerpots and water moss and to plant or transplant and problems such as weeds are avoided.

Accordingly, in the cultivation by an apparatus of the present invention, enough oxygen necessary for the roots is available because the roots are usually kept in air, the time control for giving water or culture liquid is easy because the dry condition of the roots is usually constant and it is possible to give water or culture liquid only when needed according to the sprouting season or the flowering season thereby economizing on water or culture liquid.

I claim:

1. An aeroponic apparatus comprising an open tank containing water, at least one cultivation grid mounted over said tank for holding plants such that the plants including their roots are exposed in air when watering of said plants is not required, means for attaching said plants to said grid, actuatable moving means for effecting relative movement between said grid and said tank to thereby change the relative position between said grid and said tank such that in one relative position, the roots of said plants are disposed within said tank in contact with the water in said tank and in another relative position, the roots are removed from said tank out of contact with said water in said tank, said actuatable moving means comprising vertical supports, said tank being mounted slidably between said supports for vertical movement along at least a part of said supports, and movable support means under said tank for causing said movement, said movable support means comprising horizontal bars under said tank and supporting said tank, links with upper ends articulated to the outer ends of said bars and lower ends having gears mounted thereon, a pair of parallel racks alongside said vertical supports, said gears being movable on said racks, and power means connected to said links to pivot the links and thereby moving said tank vertically.

2. An aeroponic apparatus according to claim 1, wherein said tank comprises a plurality of partitions forming separate cultivation sites therein for preventing the possible spread of infection from one plant to another fed by said water.

3. An aeroponic apparatus comprising an open tank containing water, at least one cultivation grid mounted over said tank for holding plants such that the plants including their roots are exposed in air when watering of said plants is not required, means for effecting relative movement between said grid and said tank to thereby change the relative position between said grid and said tank such that in one relative position, the roots of said plants are disposed within said tank in contact with the water in said tank and in another relative position, the roots are removed from said tank out of contact with said water in said tank, said tank having a top portion formed of flexible material, said actuatable moving means comprising horizontal supports for suspending said flexible material, and pusher means contacting the bottom of the container for pushing said flexible material upwardly to thereby raise the level of water relative to the plants.

4. An aeroponic apparatus according to claim 3, wherein said tank comprises a plurality of partitions forming separate cultivation sites therein for preventing the possible spread of infection from one plant to another fed by said water.

* * * * *